US008304092B2

(12) United States Patent
Okai et al.

(10) Patent No.: US 8,304,092 B2
(45) Date of Patent: Nov. 6, 2012

(54) SURFACE-TREATED GALVANIZED STEEL SHEET WITH SUPERIOR FLAT-PORTION CORROSION RESISTANCE, BLACKENING RESISTANCE, AND APPEARANCE AND CORROSION RESISTANCE AFTER PRESS FORMING AND AQUEOUS SURFACE-TREATMENT LIQUID FOR GALVANIZED STEEL SHEET

(75) Inventors: Kazuhisa Okai, Kawasaki (JP); Rie Umebayashi, Kawasaki (JP); Etsuo Hamada, Kawasaki (JP); Akira Matsuzaki, Kawasaki (JP); Satoru Ando, Chiba (JP)

(73) Assignee: JFE Steel Corporation, Tokyo (JP)

( * ) Notice: Subject to any disclaimer, the term of this patent is extended or adjusted under 35 U.S.C. 154(b) by 555 days.

(21) Appl. No.: 12/311,383

(22) PCT Filed: Dec. 10, 2007

(86) PCT No.: PCT/JP2007/074181
§ 371 (c)(1),
(2), (4) Date: May 11, 2009

(87) PCT Pub. No.: WO2008/072752
PCT Pub. Date: Jun. 19, 2008

(65) Prior Publication Data
US 2010/0035055 A1   Feb. 11, 2010

(30) Foreign Application Priority Data
Dec. 13, 2006   (JP) .................... 2006-336228

(51) Int. Cl.
*C08J 7/04* (2006.01)
*B32B 15/08* (2006.01)
*B05D 3/02* (2006.01)
*C04B 26/12* (2006.01)
*C08K 3/10* (2006.01)
*C08K 3/22* (2006.01)
*C04B 9/02* (2006.01)
*C23C 22/00* (2006.01)

(52) U.S. Cl. ..... 428/626; 428/341; 427/387; 427/388.4; 524/408; 524/413; 106/14.05; 106/14.11; 106/14.12; 106/14.13; 106/14.44; 148/243

(58) Field of Classification Search ................ 428/341, 428/626; 427/387, 388.4; 524/408, 413; 106/14.05, 14.11, 14.12, 14.13, 14.44; 148/243
See application file for complete search history.

(56) References Cited

U.S. PATENT DOCUMENTS

| | | | |
|---|---|---|---|
| 6,322,906 B1 * | 11/2001 | Nakakoji et al. | 428/659 |
| 2003/0213533 A1 * | 11/2003 | Sako et al. | 148/243 |
| 2004/0167266 A1 | 8/2004 | Hasegawa et al. | |

FOREIGN PATENT DOCUMENTS

| | | | |
|---|---|---|---|
| JP | 2000 248380 | * | 9/2000 |
| JP | 2000-290782 A | | 10/2000 |
| JP | 2001-158973 A | | 6/2001 |
| JP | 2001-181860 A | | 7/2001 |
| JP | 2001-234358 A | | 8/2001 |
| JP | 2001-271175 A | | 10/2001 |
| JP | 2002-030459 A | | 1/2002 |
| JP | 2002-105658 A | | 4/2002 |
| JP | 2003-013252 A | | 1/2003 |
| JP | 2003-171778 A | | 6/2003 |
| JP | 2004-183015 A | | 7/2004 |
| JP | 2004-263252 A | | 9/2004 |
| JP | 2005-048199 A | | 2/2005 |
| JP | 2006-213958 A | | 8/2006 |

* cited by examiner

*Primary Examiner* — Harold Pyon
*Assistant Examiner* — Tanisha Diggs
(74) *Attorney, Agent, or Firm* — Holtz Holtz Goodman & Chick PC

(57) ABSTRACT

An aqueous surface-treatment liquid is a treatment liquid containing a water-soluble zirconium compound, water-dispersive particulate silica, a silane coupling agent, a vanadic acid compound, a phosphoric acid compound, a nickel compound, and an acrylic resin emulsion in particular proportions. A surface-treated galvanized steel sheet produced using the treatment liquid is a galvanized steel sheet having a surface-treatment coating on a surface thereof, and the coating contains a zirconium compound, particulate silica, a silane-coupling-agent-derived component, a vanadic acid compound, a phosphoric acid compound, a nickel compound, and an acrylic resin in particular proportions. The amount of coating on a zirconium basis is 10 to 200 mg/m². This surface-treated galvanized steel sheet is chromate-free and has superior flat-portion corrosion resistance, blackening resistance, and appearance and corrosion resistance after press forming.

6 Claims, No Drawings

SURFACE-TREATED GALVANIZED STEEL SHEET WITH SUPERIOR FLAT-PORTION CORROSION RESISTANCE, BLACKENING RESISTANCE, AND APPEARANCE AND CORROSION RESISTANCE AFTER PRESS FORMING AND AQUEOUS SURFACE-TREATMENT LIQUID FOR GALVANIZED STEEL SHEET

This application is the U.S. national phase application of International Application PCT/JP2007/074181 filed Dec. 10, 2007, which claims priority from JP 2006-336228 filed Dec. 13, 2006.

TECHNICAL FIELD

The present invention relates to environmentally friendly surface-treated galvanized steel sheets, for use in automobiles, household electric appliances, building materials, etc., having coatings free of environmentally controlled substances such as hexavalent chromium, and also to aqueous surface-treatment liquids for producing such surface-treated galvanized steel sheets.

BACKGROUND ART

Galvanized steel sheets or aluminized steel sheets have been widely used as steel sheets for automobiles, household electric appliances, and building materials with their surfaces subjected to chromate treatment using treatment liquids containing hexavalent chromium as the major component to improve corrosion resistance (white rust resistance and red rust resistance).

Also, surface-treated galvanized steel sheets are often used as components for automobiles, household electric appliances, office automation equipment, etc. When used as components such as motor cases, particularly, they are subjected to press forming such as drawing. To improve the press formability of surface-treated galvanized steel sheets, it is effective to apply a lubricant or to provide the surface-treatment coating with lubricity. In some cases, however, continuous high-speed press forming is carried out in which not less than 100 pressed products are produced per minute using, for example, a transfer press. In such continuous high-speed press forming, decreased lubricity due to increased die and lubricant temperature results in galling between a press die and surface-treated steel sheets, thus degrading their appearance after the press forming.

In addition, a step of ironing steel sheets in continuous high-speed press forming involves a severe pressing environment in which sliding movement between the die and the surface-treated steel sheets inevitably causes part of the surface-treatment coating and the plating to peel off and leave peeling scraps. In such a severe pressing environment, peeling scraps accumulate in the lubricant and readhere to the subsequent works. This lowers productivity because cleaning is needed in the final step and degrades the appearance of the works after the press forming because of darkening in the surfaces of the works (surface darkening), which is not readily eliminated by cleaning. Forming a thinner coating to reduce peeling scraps, on the other hand, decreases flat-portion corrosion resistance before press forming and also decreases corrosion resistance after press forming because the coating peels off during press forming.

Surface-treated galvanized steel sheets subjected to conventional chromate treatment are subjected to press forming with a lubricant applied thereto because the chromate coating itself has no lubricity. The chromate coating, however, maintains its superior corrosion resistance even after press forming in a severe pressing environment, such as continuous high-speed press forming, while preventing considerable degradation of the appearance after the press forming because even an ultrathin chromate coating provides superior rust resistance.

In other cases, surface-treated galvanized steel sheets are subjected to press forming with an organic lubricant coating formed as a second layer after chromate treatment to provide lubricity so that the steps of applying a lubricant and degreasing are not required. A surface-treated galvanized steel sheet with an organic lubricant coating has superior performance in terms of appearance and corrosion resistance after press forming if conditions such as continuity, forming rate, and ironing are mild. The appearance and corrosion resistance after press forming, however, are considerably degraded in a severe pressing environment as described above even if the forming is performed after lubrication. This is probably because peelings tend to adhere to the works and the die during the press forming. The surfaces of the works tend to be darkened, and the peelings adhering to the die damage the surfaces of the subsequent works, thus decreasing their corrosion resistance.

Recently, as a measure against global environmental problems, surface-treated steel sheets with surface-treatment coatings free of hexavalent chromium, an environmentally controlled substance, have increasingly been used instead of conventional chromate treatment, and the following chromate-free treatment methods have been proposed to inhibit white zinc rust on galvanized steel sheets.

For example, (1) a method based on the passivation of molybdic acid or tungstic acid, which belongs to the same group as chromic acid, namely, the IVA group; (2) a method using a metal salt of a transition metal such as titanium, zirconium, vanadium, manganese, nickel, or cobalt or of a rare-earth element such as lanthanum or cerium; (3) a method based on a chelating agent such as a polyphenol carboxylic acid, e.g., tannic acid, or a compound containing sulfur or nitrogen; (4) a method in which a polysiloxane coating is formed using a silane coupling agent; and combinations thereof are available.

Specifically, the following methods are available:
(1) a method in which a coating is formed using a treatment liquid containing an organic resin such as a polyvinyl phenol derivative together with, for example, an acid component, a silane coupling agent, and a vanadium compound (for example, Patent Documents 1, 2, and 12);
(2) a method in which a coating containing a water-based resin, a thiocarbonyl group, a vanadic acid compound, and phosphoric acid is formed (for example, Patent Document 3);
(3) a method in which a coating is formed using a treatment liquid containing a metal compound such as a titanium compound together with a fluoride, an inorganic acid such as a phosphoric acid compound, and an organic acid (for example, Patent Documents 4, 5, 8, 9, 10, 11, and 13); and
(4) a method in which a compound coating of a rare-earth element such as cerium, lanthanum, or yttrium and titanium or zirconium is formed so that an oxide layer and a hydroxide layer are concentrated on the plating interface side and the surface side, respectively, in the coating (Patent Document 6), and a method in which a compound coating of cerium oxide and silicon oxide is formed (Patent Document 7).

Patent Document 1: Japanese Unexamined Patent Application Publication No. 2003-13252
Patent Document 2: Japanese Unexamined Patent Application Publication No. 2001-181860
Patent Document 3: Japanese Patent No. 3549455

Patent Document 4: Japanese Patent No. 3302677
Patent Document 5: Japanese Unexamined Patent Application Publication No. 2002-105658
Patent Document 6: Japanese Unexamined Patent Application Publication No. 2001-234358
Patent Document 7: Japanese Patent No. 3596665
Patent Document 8: Japanese Unexamined Patent Application Publication No. 2004-183015
Patent Document 9: Japanese Unexamined Patent Application Publication No. 2003-171778
Patent Document 10: Japanese Unexamined Patent Application Publication No. 2001-271175
Patent Document 11: Japanese Unexamined Patent Application Publication No. 2006-213958
Patent Document 12: Japanese Unexamined Patent Application Publication No. 2004-263252
Patent Document 13: Japanese Unexamined Patent Application Publication No. 2005-48199

The above coatings in the conventional art are intended to inhibit white zinc rust through the combined addition of organic and inorganic components. The methods (1) and (2) take the approach of achieving corrosion resistance primarily by adding an organic resin. In particular, organic-resin-rich coating compositions are superior in flat-portion corrosion resistance, although they are extremely inferior in appearance and corrosion resistance after continuous high-speed press forming because, as described above, peelings tend to adhere to the works and the die during the press forming.

The methods (3) and (4), on the other hand, propose a single inorganic coating free of organic components. A compound coating of metal oxide/hydroxide, however, is disadvantageous for continuous high-speed press forming because its thickness must be increased to achieve sufficient corrosion resistance, and the increased thickness tends to result in coating unevenness and coloring. In addition, such techniques cannot provide sufficient corrosion resistance for thin coatings because they are designed without considering appearance and corrosion resistance after press forming, particularly those after continuous high-speed press forming, thus failing to achieve both superior corrosion resistance and appearance after press forming.

Thus, although the above conventional techniques provide some corrosion resistance, numerous types of organic-resin-based coatings and thick coatings that have so far been proposed are unsuitable for continuous high-speed press forming and cannot achieve both superior flat-portion corrosion resistance and appearance and corrosion resistance after continuous high-speed press forming. As for the formation of an inorganic coating, no technique has been proposed that provides sufficient flat-portion corrosion resistance, blackening resistance, and appearance and corrosion resistance after continuous high-speed press forming.

Accordingly, an object of the present invention is to solve the above problems in the conventional art and provide a surface-treated galvanized steel sheet with a coating free of hexavalent chromium that has superior flat-portion corrosion resistance, blackening resistance, and appearance and corrosion resistance after continuous high-speed press forming.

Another object of the present invention is to provide an aqueous surface-treatment liquid with which such a surface-treated galvanized steel sheet can be stably produced and a method for producing a surface-treated galvanized steel sheet using the aqueous surface-treatment liquid.

DISCLOSURE OF INVENTION

The present invention, which has been made to solve the above problems, is summarized as follows:

[1] An aqueous surface-treatment liquid for a galvanized steel sheet, containing a water-soluble zirconium compound (A), water-dispersive particulate silica (B), a silane coupling agent (C), a vanadic acid compound (D), a phosphoric acid compound (E), a nickel compound (F), and an acrylic resin emulsion (G) so as to satisfy the following conditions (1) to (7):

(1) the mass ratio (B)/(A) of the amount of water-dispersive particulate silica (B) to the amount of (A) on a zirconium basis=0.1 to 1.2;

(2) the mass ratio (C)/(A) of the amount of silane coupling agent (C) to the amount of water-soluble zirconium compound (A) on a zirconium basis=0.5 to 3.0;

(3) the mass ratio (D)/(A) of the amount of vanadic acid compound (D) on a vanadium basis to the amount of water-soluble zirconium compound (A) on a zirconium basis=0.02 to 0.15;

(4) the mass ratio (E)/(A) of the amount of phosphoric acid compound (E) on a phosphorus basis to the amount of water-soluble zirconium compound (A) on a zirconium basis=0.03 to 0.30;

(5) the mass ratio (F)/(A) of the amount of nickel compound (F) on a nickel basis to the amount of water-soluble zirconium compound (A) on a zirconium basis=0.005 to 0.10;

(6) the mass ratio (SI)/(A) of the total amount (SI) of water-dispersive particulate silica (B) and silane coupling agent (C) on a silicon basis to the amount of water-soluble zirconium compound (A) on a zirconium basis=0.15 to 1.0; and (7) the mass ratio (G)/(X) of the solid content of the acrylic resin emulsion (G) to the total solid content (X) of the aqueous surface-treatment liquid=0.005 to 0.18.

[2] The aqueous surface-treatment liquid for a galvanized steel sheet according to Item [1] above, further containing a wax (H) so as to satisfy the following condition (8):

(8) the mass ratio (H)/(X) of the solid content of the wax (H) to the total solid content (X) of the aqueous surface-treatment liquid=0.01 to 0.10.

[3] A method for producing a surface-treated galvanized steel sheet having superior flat-portion corrosion resistance, blackening resistance, and appearance and corrosion resistance after press forming, the method including applying the aqueous surface-treatment liquid according to Item [1] or [2] above to a surface of a galvanized steel sheet so that the amount of coating on a zirconium basis is 10 to 200 mg/m$^2$ and drying the coating.

[4] A surface-treated galvanized steel sheet having superior flat-portion corrosion resistance, blackening resistance, and appearance and corrosion resistance after press forming, being a galvanized steel sheet having a surface-treatment coating on a surface thereof, the coating containing a zirconium compound (a), particulate silica (b), a silane-coupling-agent-derived component (c), a vanadic acid compound (d), a phosphoric acid compound (e), a nickel compound (f), and an acrylic resin (g) so as to satisfy the following conditions (1) to (6):

(1) the mass ratio (b)/(a) of the amount of particulate silica (b) to the amount of zirconium compound (a) on a zirconium basis=0.1 to 1.2;

(2) the mass ratio (Si)/(a) of the total amount (Si) of particulate silica (b) and silane-coupling-agent-derived component (c) on a silicon basis to the amount of zirconium compound (a) on a zirconium basis=0.15 to 1.0;

(3) the mass ratio (d)/(a) of the amount of vanadic acid compound (d) on a vanadium basis to the amount of zirconium compound (a) on a zirconium basis=0.02 to 0.15;

(4) the mass ratio (e)/(a) of the amount of phosphoric acid compound (e) on a phosphorus basis to the amount of zirconium compound (a) on a zirconium basis=0.03 to 0.30;

(5) the mass ratio (f)/(a) of the amount of nickel compound (f) on a nickel basis to the amount of zirconium compound (a) on a zirconium basis=0.005 to 0.10; and (6) the mass ratio (g)/(x) of the amount of acrylic resin (g) to the total solid content (x) of the coating=0.005 to 0.18;

wherein the amount of coating on a zirconium basis is 10 to 200 mg/m$^2$.

[5] The surface-treated galvanized steel sheet having superior flat-portion corrosion resistance, blackening resistance, and appearance and corrosion resistance after press forming according to Item [4] above, wherein the surface-treatment coating further contains a wax (h) so as to satisfy the following condition (7):

(7) the mass ratio (h)/(x) of the amount of wax (h) to the total solid content (x) of the coating=0.01 to 0.10.

BEST MODES FOR CARRYING OUT THE INVENTION

The details of the present invention will now be described.

A galvanized steel sheet used as a base of a surface-treated steel sheet of the present invention may be any steel sheet having a zinc-containing plating, such as, though not limited to, a zinc-plated steel sheet, a zinc-nickel-alloy-plated steel sheet, a zinc-aluminum-alloy-plated steel sheet (e.g., a steel sheet plated with an alloy containing zinc and 5% by mass aluminum or an alloy containing zinc and 55% by mass aluminum), or a zinc-aluminum-magnesium-alloy-plated steel sheet (e.g., a steel sheet plated with an alloy containing zinc, 6% by mass aluminum, and 3% by mass magnesium or an alloy containing zinc, 11% by mass aluminum, and 3% by mass magnesium).

In addition, any of the above galvanized steel sheets may be used with its plating layer containing a small amount of another metal element or impurity, for example, one or more of nickel, cobalt, manganese, iron, molybdenum, tungsten, titanium, chromium, aluminum, magnesium, lead, antimony, tin, and copper. The galvanized steel sheet used may also be a multilayer-plating steel sheet having two or more plating layers of the same type or different types selected from such types of plating as described above.

First, an aqueous surface-treatment liquid for the galvanized steel sheet of the present invention will be described.

This aqueous surface-treatment liquid contains water as a solvent and also contains a water-soluble zirconium compound (A), water-dispersive particulate silica (B), a silane coupling agent (C), a vanadic acid compound (D), a phosphoric acid compound (E), a nickel compound (F), and an acrylic resin emulsion (G), preferably, contains these components (A) to (G) as the major components. This aqueous surface-treatment liquid is free of hexavalent chromium. In addition, the aqueous surface-treatment liquid may further contain a wax (H) if necessary.

Examples of the water-soluble zirconium compound (A) include, though not limited to, zirconium nitrate, zirconium oxynitrate, zirconyl acetate, zirconyl sulfate, ammonium zirconyl carbonate, potassium zirconyl carbonate, and sodium zirconyl carbonate, and one or more of them may be used. The water-soluble zirconium compound used may also be an inorganic fluorine-containing compound such as fluorozirconic acid or a salt thereof if it is soluble in the treatment liquid. Fluorozirconic acid and salts thereof, however, are less desirable because such inorganic fluorine-containing compounds often impair the stability of the surface-treatment liquid of the present invention, which contains silica as an essential component.

The water-dispersive particulate silica (B) used may be colloidal silica or dry-process silica and preferably has an average primary particle size of 50 nm or less, although the particle size, type, etc. are not particularly limited. Examples of colloidal silica include SNOWTEX O, C, N, 20, OS, and OXS (trade names) manufactured by Nissan Chemical Industries, Ltd., whereas examples of wet-process silica include AEROZIL 50, 130, 200, 300, and 380 (trade names) manufactured by Nippon Aerozil Co., Ltd., and one or more of them may be used.

The proportion of the water-dispersive particulate silica (B) is 0.1 to 1.2 in terms of the mass ratio (B)/(A) of the amount of water-dispersive particulate silica (B) to the amount of water-soluble zirconium compound (A) on a zirconium basis. If (B)/(A) falls below 0.1, the corrosion resistance and the appearance after press forming are degraded. If the mass ratio (B)/(A) exceeds 1.2, on the other hand, the corrosion resistance is degraded because the coating cannot be appropriately formed. From these viewpoints, the mass ratio (B)/(A) is more preferably 0.2 to 1.0, particularly preferably 0.3 to 0.8.

Examples of the silane coupling agent (C) include vinylmethoxysilane, vinylethoxysilane, vinyltrichlorosilane, vinyltrimethoxysilane, vinyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-β(aminoethyl)-γ-aminopropylmethyldimethoxysilane, N-β(aminoethyl)-γ-aminopropylmethyltrimethoxysilane, γ-aminopropyltrimethoxysilane, γ-aminopropyltriethoxysilane, γ-methacryloxypropylmethyldimethoxysilane, 7-methacryloxypropylmethyltrimethoxysilane, γ-methacryloxypropylmethyldiethoxysilane, γ-methacryloxypropylmethyltriethoxysilane, γ-mercaptopropylmethyldimethoxysilane, γ-mercaptopropylmethyltrimethoxysilane, p-styryltrimethoxysilane, γ-acryloxypropyltrimethoxysilane, N-phenyl-γ-aminopropyltrimethoxysilane, γ-ureidopropyltriethoxysilane, γ-chloropropyltrimethoxysilane, bis(triethoxysilylpropyl)tetrasulfide, γ-isocyanatopropyltriethoxysilane, γ-triethoxysilyl-N-(1,3-dimethyl-butylidene)propylamine, and N-(vinylbenzylamine)-β-aminoethyl-γ-aminopropyltrimethoxysilane, and one or more of them may be used.

The proportion of the silane coupling agent (C) is 0.5 to 3.0 in terms of the mass ratio (C)/(A) of the amount of silane coupling agent (C) to the amount of water-soluble zirconium compound (A) on a zirconium basis. If the mass ratio (C)/(A) falls below 0.5, the corrosion-resistance and the appearance after press forming are degraded. If the mass ratio (C)/(A) exceeds 3.0, on the other hand, the corrosion resistance is degraded because the coating cannot be appropriately formed, and the stability of the treatment liquid is also decreased. From these viewpoints, the mass ratio (C)/(A) is more preferably 1.0 to 2.5, particularly preferably 1.2 to 2.0.

Examples of the vanadic acid compound (D) include ammonium metavanadate and sodium metavanadate, and one or more of them may be used. The vanadic acid compound includes pentavalent vanadium; a tetravalent vanadium compound does not ensure sufficient corrosion resistance.

The proportion of the vanadic acid compound (D) is 0.02 to 0.15 in terms of the mass ratio (D)/(A) of the amount of vanadic acid compound (D) on a vanadium basis to the amount of water-soluble zirconium compound (A) on a zirconium basis. If the mass ratio (D)/(A) falls below 0.02, the corrosion resistance is degraded. If the mass ratio (D)/(A) exceeds 0.15, on the other hand, the appearance is degraded because the coating is colored, and the blackening resistance is also degraded. From these viewpoints, the mass ratio (D)/(A) is more preferably 0.04 to 0.12, particularly preferably 0.05 to 0.10.

The type of phosphoric acid compound (E) is not particularly limited as long as it is soluble in the treatment liquid. Examples of the phosphoric acid compound include phosphoric acid, monobasic phosphate salts, dibasic phosphate salts, tribasic phosphate salts, pyrophosphoric acid, pyrophosphate salts, tripolyphosphoric acid, condensed phosphate salts such as tripolyphosphate salts, phosphorous acid, phosphite salts, hypophosphorous acid, hypophosphite salts, phosphonic acid, and phosphonate salts. Examples of phosphonate salts include nitrilotrismethylenephosphonic acid, phosphonobutanetricarboxylic acid, ethylenediaminetetramethylenephosphonic acid, methyldiphosphonic acid, methylenephosphonic acid, ethylidenediphosphonic acid, and ammonium salts and alkali metal salts thereof. One or more of these phosphoric acid compounds may be used.

The proportion of the phosphoric acid compound (E) is to 0.30 in terms of the mass ratio (E)/(A) of the amount of phosphoric acid compound (E) on a phosphorus basis to the amount of water-soluble zirconium compound (A) on a zirconium basis. If the mass ratio (E)/(A) falls below 0.03, the corrosion resistance is degraded. If the mass ratio (E)/(A) exceeds 0.30, on the other hand, the appearance and blackening resistance of the coating are degraded. From these viewpoints, the mass ratio (E)/(A) is more preferably to 0.20, particularly preferably 0.10 to 0.18.

The type of nickel compound (F) is not particularly limited as long as it is soluble in the treatment liquid. Examples of the nickel compound (F) include nickel nitrate, nickel sulfate, nickel carbonate, nickel chloride, and nickel phosphate, and one or more of them may be used.

The proportion of the nickel compound (F) is 0.005 to in terms of the mass ratio (F)/(A) of the amount of nickel compound (F) on a nickel basis to the amount of water-soluble zirconium compound (A) on a zirconium basis. If the mass ratio (F)/(A) falls below 0.005, the blackening resistance is degraded. If the mass ratio (F)/(A) exceeds 0.10, on the other hand, the corrosion resistance is degraded. From these viewpoints, the mass ratio (F)/(A) is more preferably 0.01 to 0.08, particularly preferably 0.02 to 0.06.

The mass ratio (SI)/(A) of the total amount (SI) of water-dispersive particulate silica (B) and silane coupling agent (C) on a silicon basis to the amount of water-soluble zirconium compound (A) on a zirconium basis is 0.15 to 1.0. If the mass ratio (SI)/(A) falls below 0.15, the corrosion resistance and the appearance after press forming are degraded. If the mass ratio (SI)/(A) exceeds 1.0, on the other hand, the corrosion resistance is degraded. From these viewpoints, the mass ratio (SI)/(A) is more preferably 0.25 to 0.85, particularly preferably 0.30 to 0.68.

The acrylic resin emulsion (G) is an aqueous emulsion resin prepared by emulsion polymerization of a vinyl monomer such as acrylic acid, methacrylic acid, an acrylate ester, a methacrylate ester, or styrene. Whether an emulsifier is used or not and the type of emulsifier are not particularly limited as long as the acrylic resin emulsion (G) is soluble in the treatment liquid. In particular, nonionic emulsifiers are preferred. Among nonionic emulsifiers, those with structures including polyethylene oxide or polypropylene oxide are particularly preferred.

The proportion of the acrylic resin emulsion (G) is 0.005 to 0.18 in terms of the mass ratio (G)/(X) of the solid content of the acrylic resin emulsion (G) to the total solid content (X) of the aqueous surface-treatment liquid. If the mass ratio (G)/(X) falls below 0.005, the corrosion resistance is degraded. If the mass ratio (G)/(X) exceeds 0.18, on the other hand, the appearance after press forming is degraded because of the increased organic content. From these viewpoints, the mass ratio (G)/(X) is more preferably 0.01 to 0.16, particularly preferably 0.02 to 0.14.

In addition, the acrylic resin constituting the acrylic resin emulsion (G) preferably has a glass transition temperature (Tg), calculated by the following equation (1), of 10° C. to 30° C. The following equation (1) is generally referred to as the Fox equation:

$$1/Tg = \Sigma(Wi/Tgi) \quad (1)$$

If Tg of the acrylic resin falls below 10° C., the appearance after press forming tends to be degraded. If Tg exceeds 30° C., on the other hand, the corrosion resistance tends to be degraded.

The wax (H) may be added to the aqueous surface-treatment liquid of the present invention to further improve its lubricity performance for continuous high-speed press forming.

The type of wax (H) is not particularly limited as long as it is soluble in the treatment liquid. Examples of the wax (H) include polyolefin wax such as polyethylene, montan wax, paraffin wax, microcrystalline wax, carnauba wax, lanolin wax, silicone wax, and fluorinated wax, and one or more of them may be used. Examples of polyolefin wax include polyethylene wax, oxidized polyethylene wax, and polypropylene wax, and one or more of them may be used.

The proportion of the wax (H) is preferably 0.01 to 0.10 in terms of the mass ratio (H)/(X) of the solid content of the wax (H) to the total solid content (X) of the aqueous surface-treatment liquid. A mass ratio (H)/(X) of 0.01 or more results in improved lubricity, particularly for continuous pressing. A mass ratio (H)/(X) of 0.10 or less, on the other hand, is preferred in view of corrosion resistance. From these viewpoints, the mass ratio (H)/(X) is more preferably 0.02 to 0.08.

The pH of the aqueous surface-treatment liquid of the present invention is preferably, though not limited to, 6 to 11, more preferably 8 to 10, in view of the stability of the treatment liquid. If the pH of the treatment liquid-falls below 6, the stability of the treatment liquid, the corrosion resistance, and the appearance of the coating are degraded. If the pH exceeds 11, on the other hand, the appearance of the coating and the corrosion resistance tend to be degraded because zinc is significantly etched. The alkali used to adjust the pH is preferably ammonia or an amine, whereas the acid used is preferably a phosphoric acid compound.

The above aqueous surface-treatment liquid is applied to the surface of the galvanized steel sheet and is dried by heating to form a surface-treatment coating. The amount of surface-treatment coating after the drying by heating is preferably 10 to 200 mg/m² on a zirconium basis, where the zirconium is derived from the zirconium compound in the coating. If the amount of coating falls below 10 mg/m², sufficient corrosion resistance cannot be achieved. If the amount of coating exceeds 200 mg/m², on the other hand, the appearance after press forming and the corrosion resistance are degraded because the coating is thick. From these viewpoints, the amount of coating is more preferably 20 to 180 mg/m², particularly preferably 30 to 150 mg/m².

In addition, although there is no particular limitation to the thickness of the surface-treatment coating after the drying by heating as long as the amount of coating on a zirconium basis falls within the above range, the thickness is preferably adjusted to 0.5 µm or less while ensuring that the proportions of the above components and the amount of coating on a zirconium basis fall within the above ranges. If the thickness of the coating exceeds 0.5 µm, the appearance after continuous high-speed press forming tends to be degraded because more coating peeling scraps accumulate during the continuous high-speed press forming. From this viewpoint, the thickness of the coating is more preferably 0.4 µm or less, still more preferably 0.3 µm or less.

The aqueous surface-treatment liquid may be applied to the surface of the galvanized steel sheet to form the surface-treatment coating by a common method. For example, the surface of the galvanized steel sheet may be treated with the aqueous surface-treatment liquid by coating, dipping, or spraying before being dried by heating. The coating, particularly, may be performed by any method, such as using a roller coater (e.g., three-roller or two-roller), a squeeze coater, a bar coater, or a spray coater. After the treatment by coating such as using a squeeze coater, dipping, or spraying, an air knife or a squeeze roller may be used to adjust the amount of coating and achieve uniform appearance and coating thickness.

Examples of the heating means used for the drying by heating include, though not limited to, a dryer, a hot-air furnace, a high-frequency induction heating furnace, and an infrared furnace. The temperature for the drying by heating is preferably 50° C. to 250° C. as peak metal temperature. If the temperature exceeds 250° C., the coating may crack, and accordingly the corrosion resistance may be degraded. If the temperature falls below 50° C., on the other hand, the corrosion resistance may be degraded because more moisture remains in the coating. From these viewpoints, the temperature for the drying by heating is more preferably 60° C. to 200° C., particularly preferably 60° C. to 180° C.

Next, the surface-treated galvanized steel sheet of the present invention, produced using the above aqueous surface-treatment liquid, will be described.

The surface-treated galvanized steel sheet is a galvanized steel sheet having a surface-treatment coating on a surface thereof, and the coating contains a zirconium compound (a), particulate silica (b), a silane-coupling-agent-derived component (c), a vanadic acid compound (d), a phosphoric acid compound (e), a nickel compound (g), and an acrylic resin (g), preferably, contains these components as the major components. This surface-treatment coating is free of hexavalent chromium. In addition, the surface-treatment coating may further contain a wax (h) if necessary.

The zirconium compound (a) is a component derived from zirconium in the water-soluble zirconium compound (A) added to the treatment liquid. The details of the water-soluble zirconium compound (A) are as described above.

The particulate silica (b) is derived from the water-dispersive particulate silica (B) added to the treatment liquid. The details of the water-dispersive particulate silica (B) are as described above.

The proportion of the particulate silica (b) in the coating is 0.1 to 1.2 in terms of the mass ratio (b)/(a) of the amount of particulate silica (b) to the amount of zirconium compound (a) on a zirconium basis. If (b)/(a) falls below 0.1, the corrosion resistance and the appearance after press forming are degraded. If the mass ratio (b)/(a) exceeds 1.2, on the other hand, the corrosion resistance is degraded because the coating cannot be appropriately formed. From these viewpoints, the mass ratio (b)/(a) is more preferably 0.2 to 1.0, particularly preferably 0.3 to 0.8.

The silane-coupling-agent-derived component (c) is derived from the silane coupling agent (C) added to the treatment liquid. The details of the silane coupling agent (C) are as described above.

The mass ratio (Si)/(a) of the total amount (Si) of particulate silica (b) and silane-coupling-agent-derived component (c) on a silicon basis to the amount of zirconium compound (a) on a zirconium basis is 0.15 to 1.0. If the mass ratio (Si)/(a) falls below 0.15, the corrosion resistance and the appearance after press forming are degraded. If the mass ratio (Si)/(a) exceeds 1.0, on the other hand, the corrosion resistance is degraded. From these viewpoints, the mass ratio (Si)/(a) is more preferably 0.25 to 0.85, particularly preferably 0.30 to 0.68.

The vanadic acid compound (d) is derived from the vanadic acid compound (D) added to the treatment liquid. The details of the vanadic acid compound (D) are as described above.

The proportion of the vanadic acid compound (d) in the coating is 0.02 to 0.15 in terms of the mass ratio (d)/(a) of the amount of vanadic acid compound (d) on a vanadium basis to the amount of zirconium compound (a) on a zirconium basis. If the mass ratio (d)/(a) falls below 0.02, the corrosion resistance is degraded. If the mass ratio (d)/(a) exceeds 0.15, on the other hand, the appearance is degraded because the coating is colored, and the blackening resistance is also degraded. From these viewpoints, the mass ratio (d)/(a) is more preferably 0.04 to 0.12, particularly preferably 0.05 to 0.10.

The phosphoric acid compound (e) is derived from the phosphoric acid compound (E) added to the treatment liquid. The details of the phosphoric acid compound (E) are as described above.

The proportion of the phosphoric acid compound (e) in the coating is 0.03 to 0.30 in terms of the mass ratio (e)/(a) of the amount of phosphoric acid compound (e) on a phosphorus basis to the amount of zirconium compound (a) on a zirconium basis. If the mass ratio (e)/(a) falls below 0.03, the corrosion resistance is degraded. If the mass ratio (e)/(a) exceeds 0.30, on the other hand, the appearance and blackening resistance of the coating are degraded. From these viewpoints, the mass ratio (e)/(a) is more preferably 0.06 to 0.20, particularly preferably 0.10 to 0.18.

The nickel compound (f) is derived from the nickel compound (F) added to the treatment liquid. The details of the nickel compound (F) are as described above.

The proportion of the nickel compound (f) in the coating is 0.005 to 0.10 in terms of the mass ratio (f)/(a) of the amount of nickel compound (f) on a nickel basis to the amount of zirconium compound (a) on a zirconium basis. If the mass ratio (f)/(a) falls below 0.005, the blackening resistance is degraded. If the mass ratio (f)/(a) exceeds 0.10, on the other hand, the corrosion resistance is degraded. From these viewpoints, the mass ratio (f)/(a) is more preferably 0.01 to 0.08, particularly preferably 0.02 to 0.06.

The acrylic resin (g) is derived from the acrylic resin emulsion (G) added to the treatment liquid. The details of the acrylic resin emulsion (G) and the acrylic resin are as described above.

The proportion of the acrylic resin (g) in the coating is 0.005 to 0.18 in terms of the mass ratio (g)/(x) of the amount of acrylic resin (g) to the total solid content (x) of the coating. If the mass ratio (g)/(x) falls below 0.005, the corrosion resistance is degraded. If the mass ratio (g)/(x) exceeds 0.18, on the other hand, the appearance after press forming is degraded because of the increased organic content. From these viewpoints, the mass ratio (g)/(x) is more preferably 0.01 to 0.16, particularly preferably 0.02 to 0.14.

The surface-treatment coating may further contain the wax (h) to achieve improved lubricity performance for continuous high-speed press forming. This wax (h) is derived from the wax (H) added to the treatment liquid. The details of the wax (H) are as described above.

The proportion of the wax (h) in the coating is preferably 0.01 to 0.10 in terms of the mass ratio (h)/(x) of the amount of wax (h) to the total solid content (x) of the coating. A mass ratio (h)/(x) of 0.01 or more results in improved lubricity, particularly for continuous pressing. A mass ratio (h)/(x) of 0.10 or less, on the other hand, is preferred in view of corrosion resistance. From these viewpoints, the mass ratio (H)/(X) is more preferably 0.02 to 0.08.

As described above, the amount of surface-treatment coating is 10 to 200 mg/m$^2$, preferably 20 to 180 mg/m$^2$, more preferably 30 to 150 mg/m$^2$, on a zirconium basis, where the zirconium is derived from the zirconium compound in the coating. Also, the thickness of the surface-treatment coating is preferably 0.5 μm or less, more preferably 0.4 μm or less, still more preferably 0.3 μm or less.

Although the reason why the surface-treated galvanized steel sheet according to the present invention achieves superior flat-portion corrosion resistance, blackening resistance, and appearance and corrosion resistance after press forming has not been fully understood, the following mechanism seems to be responsible.

First, the water-soluble zirconium compound, the water-dispersive particulate silica, and the silane coupling agent form the backbone of the coating. The water-dispersive particulate silica maintains its shape in the coating after the drying. The silane coupling agent, on the other hand, is hydrolyzed to produce a silanol and an alcohol when dissolved in water. The resultant silanol undergoes dehydration condensation to form a polysiloxane. With the polysiloxane portion serving as a core, double structures having alkyl groups facing outward are formed and dispersed in water.

The water-soluble zirconium compound spreads between the particulate silica (particles) and the double structures including polysiloxane and serves as a binder therefor in the coating after the drying, thus fastening them together and forming the coating. The inorganic coating thus formed tends to be finely crushed by a stress during press forming and, unlike organic polymers, has no stickiness. This significantly alleviates problems such as darkening and black scraps because little metal powder and coating scraps produced during the press forming adhere to and accumulate on workpieces and dies. Although such a coating may have insufficient corrosion resistance because it is easily broken by a smaller stress, sufficient corrosion resistance can be stably achieved in the present invention by adding an appropriate amount of particular resin (acrylic resin) to the coating so that the stress experienced by the coating can be relieved while solving the problem of appearance after press forming.

The water-soluble zirconium compound, the water-dispersive particulate silica, the silane coupling agent, and the acrylic resin, which, as described above, are components forming the backbone of the coating, are no longer dissolved in water once they are dried, thus providing a barrier effect. In contrast, the vanadic acid compound and the phosphoric acid compound are homogeneously dispersed in the coating and are present in water-soluble form, having an inhibitor effect against zinc corrosion. Specifically, the vanadic acid compound inhibits zinc corrosion itself through passivation, whereas the phosphoric acid compound etches zinc when coming into contact therewith and forms an insoluble metal salt with dissolved zinc or, after zinc corrosion has occurred, captures zinc ions in the coating to inhibit further corrosion. Thus, the combined use of such inhibitors with different corrosion-inhibiting mechanisms offers superior corrosion resistance after press forming as well as superior flat-portion corrosion resistance.

Although the mechanism by which zinc plating is blackened has not been fully understood, it seems that oxygen-depleted zinc oxide is present in minute form and therefore looks black. Whatever the mechanism, the blackening will be inhibited by modifying the zinc surface because the oxidation of zinc present near the surface is obviously responsible. In the present invention, the nickel compound is present as ions in the treatment liquid and, when coming into contact with zinc, deposits on the zinc surface by replacing zinc because of their ionization tendencies (in this case, zinc is basic and nickel is noble) or concentrates on the zinc surface, thus modifying the zinc surface and preventing it from being blackened.

EXAMPLES

The water-soluble zirconium compounds shown in Table 2, the water-dispersive particulate silica shown in Table 3, the silane coupling agents shown in Table 4, the vanadium compounds shown in Table 5, the phosphoric acid compounds shown in Table 6, the nickel compounds shown in Table 7, the acrylic resin emulsions (nonionic acrylic resin emulsions) shown in Table 8, and the waxes shown in Table 9 were used to prepare the aqueous surface-treatment liquids shown in Tables 10 to 13 by adding the above components to water. The pH of the treatment liquids was adjusted with ammonia and phosphoric acid.

Steel sheets for treatment, namely, the galvanized steel sheets shown in Table 1, were alkali-degreased, cleaned with water, and dried. Surface-treatment coatings were then formed thereon by applying the above aqueous surface-treatment liquids using a bar coater and immediately drying the coatings by heating so that the surface temperature of the steel sheets reached a predetermined temperature within several seconds to a dozen or so seconds. The thickness of the surface-treatment coatings was adjusted depending on the density of the aqueous surface-treatment liquids, and the amount of coating on a zirconium basis was determined using a fluorescence X-ray analyzer.

The solid content was measured by calculation from a weight change that a sample put on aluminum foil underwent after being dried by heating in a drying furnace maintained at 105° C. for three hours.

The coating thickness was measured using a transmission electron microscope (TEM) after sample sections were prepared using a focused ion beam (FIB) processing apparatus ("FB2000A" manufactured by Hitachi, Ltd.) and an accompanying microsampling apparatus. Before the FIB processing, surfaces of test pieces of the surface-treated steel sheets for preparation of the section samples were coated with carbon (C) protective films with a thickness of about 200 nm by flash deposition and were further coated with gold (Au) protective films by sputtering to protect the sample sections from being damaged by ion beam irradiation. The surface-protected test pieces were set to the FIB processing apparatus, were further coated at sampling positions with carbon protective films with a thickness of about 500 nm using a chemical vapor deposition (CVD) mechanism of the FIB processing apparatus, and were subjected to ion beam cutting to prepare the sample sections. The sample sections prepared using the microsampling apparatus (about 20 μm in the width direction and about 10 μm in the depth direction) were fixed to linear portions of a special semicircular molybdenum mesh using the CVD mechanism and were finished by ion beam cutting to a thickness suitable for TEM observation (about 0.1 μmt). The sample sections were then observed by TEM at an acceleration voltage of 200 kV. The coating thickness was measured at three spots within a distance of about 10 μm, and the average thereof was determined as the coating thickness.

The quality performance (flat-portion corrosion resistance, blackening resistance, and appearance and corrosion resistance after press forming) of the resultant surface-treated galvanized steel sheets was evaluated by the following methods. The results are shown in Tables 14 to 17 along with the production conditions and the coating compositions. For the coating compositions of the surface-treated galvanized steel sheets, Tables 14 to 17 do not list the mass ratio (b)/(a) of the amount of particulate silica (b) to the amount of zirconium compound (a) on a zirconium basis, the mass ratio (d)/(a) of the amount of vanadic acid compound (d) on a vanadium basis to the amount of zirconium compound (a) on a zirconium basis, the mass ratio (e)/(a) of the amount of phosphoric acid compound (e) on a phosphorus basis to the amount of zirconium compound (a) on a zirconium basis, the mass ratio (f)/(a) of the amount of nickel compound (f) on a nickel basis to the amount of zirconium compound (a) on a zirconium basis, the mass ratio (g)/(x) of the amount of acrylic resin (g) to the total solid content (x) of the coating, and the mass ratio (h)/(x) of the amount of wax (h) to the total solid content (x) of the coating because they are equivalent to the mass ratios (B)/(A), (D)/(A), (E)/(A), (F)/(A), (G)/(X), and (H)/(X), respectively, of the compositions of the aqueous surface-treatment liquids shown in Tables 10 to 13.

(1) Flat-Portion Corrosion Resistance

Each sample was subjected to a salt spray test (JIS-Z-2371) in flat shape without press forming to evaluate its white rust resistance after 120 hours. The evaluation criteria are as follows:

A: The area percentage of white rust was less than 5%.

B: The area percentage of white rust was not less than 5% and less than 10%.

B−: The area percentage of white rust was not less than 10% and less than 25%.

C: The area percentage of white rust was not less than 25% and less than 50%.

D: The area percentage of white rust was not less than 50%.

(2) Blackening Resistance

Each sample was evaluated by measurement of color difference ΔL* (difference in CIE 1976 lightness L* between two object colors in the L*a*b* calorimetric system according to JIS-Z-8729) before and after the sample was maintained at 80° C. and 98% RH for 24 hours and by visual observation. The evaluation criteria are as follows:

A: [0≦ΔL*<1] and uniform appearance without irregularities

B: [−1<ΔL*<0] and uniform appearance without irregularities

B−: [−2<ΔL*≦−1] and uniform appearance without irregularities

C: [ΔL*≦−2] and uniform appearance without irregularities

D: Appearance with prominent irregularities (3) Appearance after Press Forming (Continuous High-Speed Press Forming)

Each sample was subjected to multistage drawing with a lubricant applied thereto under the following pressing conditions. The forming was performed ten times in a row without removing contaminants from the die, and the samples were evaluated for the amount of peeling scraps adhering to the tenth works and the degree of darkening in the surfaces of the works by visual observation.

[Pressing Conditions]

Forming rate: 450 mm/s

Blank diameter φ: 90 mm

Punch diameter and clearance (First stage) Punch diameter φ: 49 mm; punch-die clearance: 1.0 mm (Second stage) Punch diameter φ: 39 mm; punch-die clearance: 0.8 mm (Third stage) Punch diameter φ: 32 mm; punch-die clearance: 0.8 mm (Fourth stage) Punch diameter φ: 27.5 mm; punch-die clearance: 0.8 mm (Fifth stage) Punch diameter φ: 24.4 mm; punch-die clearance: 0.8 mm The evaluation criteria are as follows:

A+: No peeling scraps accumulated in the lubricant adhered to the work surface, and no darkening was observed in the work surface.

A: Almost no peeling scraps accumulated in the lubricant adhered to the work surface, and no darkening was observed in the work surface.

B: A very slight amount of peeling scraps accumulated in the lubricant adhered to the work surface, but no darkening was observed in the work surface.

B−: A slight amount of peeling scraps accumulated in the lubricant adhered to the work surface, and slight darkening was observed in the work surface.

C: A small amount of peeling scraps accumulated in the lubricant adhered to the work surface, and moderate darkening was observed in the work surface.

D: A large amount of peeling scraps accumulated in the lubricant adhered to the work surface, and considerable blackening was observed in the work surface.

(4) Corrosion Resistance after Press Forming (Continuous High-Speed Press Forming)

The samples subjected to the multistage drawing described in Item "(3) Appearance after Press Forming (Continuous High-Speed Press Forming)" above were subjected to a salt spray test (JIS-Z-2371) to evaluate their white rust resistance after 16 hours. The evaluation criteria are as follows:

A: The area percentage of white rust was less than 5%.

B: The area percentage of white rust was not less than 5% and less than 10%.

B−: The area percentage of white rust was not less than 10% and less than 25%.

C: The area percentage of white rust was not less than 25% and less than 50%.

D: The area percentage of white rust was not less than 50%.

Tables 14 to 17 show that the invention examples were excellent in flat-portion corrosion resistance and blackening resistance and were also superior in appearance and corrosion resistance after press forming. The comparative examples, in contrast, were inferior in one or more of flat-portion corrosion resistance, blackening resistance, and appearance and corrosion resistance after press forming.

Adding a wax, as described above, is effective to ensure sufficient performance after advanced pressing. To demonstrate this, the surface-treated steel sheets of No. 8 (no wax added) in Table 14 and No. 40 (wax added) in Table 15, which had the same composition except wax and differed only in whether a wax was added or not, were subjected to press forming (continuous high-speed press forming) fifty times in a row under the same pressing conditions as above, and the surfaces of the fiftieth works were evaluated for the appearance after the press forming. For No. 8, a very slight amount of peeling scraps accumulated in the lubricant adhered. For No. 40, in contrast, almost no peeling scraps adhered. For corrosion resistance after press forming (continuous high-speed press forming), the same surface-treated steel sheets were subjected to an SST to evaluate their white rust resistance after a longer period of time, namely, 30 hours. For No. 8, white rust occurred in an area percentage of about 5%. For No. 40, in contrast, almost no white rust occurred, and the area percentage of white rust was less than 5%. This demonstrates that adding a wax improves the appearance and corrosion resistance after press forming.

TABLE 1

Galvanized steel sheet

| No. | Type | Thickness (mm) | Amount of plating (g/m$^2$) |
|---|---|---|---|
| 1 | Electrogalvanized steel sheet | 0.8 | 20 |
| 2 | Hot-dip galvanized steel sheet | 0.8 | 60 |
| 3 | Alloyed hot-dip galvanized steel sheet (Fe: 10% by mass) | 0.8 | 60 |
| 4 | Zn—Ni-alloy-plated steel sheet (Ni: 12% by mass) | 0.8 | 20 |
| 5 | Hot-dip Zn—Al—Mg-alloy-plated steel sheet (Al: 5% by mass; Mg: 0.5% by mass) | 0.8 | 90 |
| 6 | Hot-dip Zn—Mg-alloy-plated steel sheet (Mg: 0.5% by mass) | 0.8 | 150 |

TABLE 2

Water-soluble zirconium compound

| No. | Type |
|---|---|
| A1 | Sodium zirconium carbonate |
| A2 | Ammonium zirconium carbonate |

TABLE 3

Water-dispersive particulate silica

| No. | Type |
|---|---|
| B1 | SNOWTEX N (trade name, manufactured by Nissan Chemical Industries, Ltd.) |
| B2 | SNOWTEX C (trade name, manufactured by Nissan Chemical Industries, Ltd.) |
| B3 | SNOWTEX O (trade name, manufactured by Nissan Chemical Industries, Ltd.) |
| B4 | AEROZIL 300 (trade name, manufactured by Nippon Aerozil Co., Ltd.) |

TABLE 4

Silane coupling agent

| No. | Type |
|---|---|
| C1 | γ-aminopropyltriethoxysilane |
| C2 | γ-glycidoxypropyltrimethoxysilane |
| C3 | γ-aminopropyltrimethoxysilane |

TABLE 5

Vanadium compound

| No. | Type |
|---|---|
| D1 | NaVO$_3$ (vanadic acid compound) |
| D2 | NH$_4$VO$_3$ (vanadic acid compound) |
| D3 | VO(C$_5$H$_7$O$_2$)$_2$ (tetravalent vanadium compound, not vanadic acid compound) |

TABLE 6

Phosphoric acid compound

| No. | Type |
|---|---|
| E1 | H$_3$PO$_4$ |
| E2 | NH$_4$(H$_3$PO$_4$) |
| E3 | Diphosphonic acid (C$_2$H$_8$P$_2$O$_7$) |

TABLE 7

Nickel compound

| No. | Type |
|---|---|
| F1 | Ni(NO$_3$)$_2$•6H$_2$O |
| F2 | NiSO$_4$•6H$_2$O |

TABLE 8

Acrylic resin emulsion

| No. | Type |
|---|---|
| G1 | Styrene-ethylmethacrylate-n-butylacrylate-acrylic acid (Tg: 18° C.) |
| G2 | Methylmethacrylate-2-ethylhexylacrylate-acrylic acid (Tg: 14° C.) |
| G3 | Styrene-ethylmethacrylate-n-butylacrylate-acrylic acid (Tg: 5° C.) |
| G4 | Styrene-ethylmethacrylate-n-butylacrylate-acrylic acid (Tg: 40° C.) |

TABLE 9

Wax

| No. | Type |
|---|---|
| H1 | Polyethylene wax (trade name: Chemipearl W900) |
| H2 | Polypropylene wax (trade name: Chemipearl WP100) |
| H3 | Paraffin wax |
| H4 | Microcrystalline wax |

TABLE 10

| | Aqueous surface-treatment liquid ||||||||||||
|---|---|---|---|---|---|---|---|---|---|---|---|
| | Component *1 ||||||||Proportion *2 *3 ||||
| No. | (A) | (B) | (C) | (D) | (E) | (F) | (G) | (H) | (B)/(A) | (C)/(A) | (D/A) | (E)/(A) |
| 1 | A1 | B1 | C1 | D1 | E1 | F1 | G1 | — | 0.15 | 1.6 | 0.06 | 0.12 |
| 2 | A1 | B1 | C1 | D1 | E1 | F1 | G1 | — | 0.25 | 1.6 | 0.06 | 0.12 |
| 3 | A1 | B1 | C1 | D1 | E1 | F1 | G1 | — | 0.50 | 1.6 | 0.06 | 0.12 |
| 4 | A1 | B1 | C1 | D1 | E1 | F1 | G1 | — | 0.90 | 1.6 | 0.06 | 0.12 |
| 5 | A1 | B1 | C1 | D1 | E1 | F1 | G1 | — | 1.10 | 1.6 | 0.06 | 0.12 |
| 6 | A2 | B1 | C2 | D1 | E2 | F1 | G2 | — | 0.70 | 0.6 | 0.09 | 0.16 |
| 7 | A2 | B1 | C2 | D1 | E2 | F1 | G2 | — | 0.70 | 1.1 | 0.09 | 0.16 |
| 8 | A2 | B1 | C2 | D1 | E2 | F1 | G2 | — | 0.70 | 1.6 | 0.09 | 0.16 |
| 9 | A2 | B1 | C2 | D1 | E2 | F1 | G2 | — | 0.70 | 2.2 | 0.09 | 0.16 |
| 10 | A2 | B1 | C2 | D1 | E2 | F1 | G2 | — | 0.70 | 2.6 | 0.09 | 0.16 |
| 11 | A2 | B1 | C2 | D1 | E2 | F1 | G2 | — | 0.15 | 1.1 | 0.09 | 0.16 |
| 12 | A2 | B1 | C2 | D1 | E2 | F1 | G2 | — | 0.30 | 1.2 | 0.09 | 0.16 |
| 13 | A2 | B1 | C3 | D1 | E2 | F1 | G2 | — | 0.50 | 1.8 | 0.09 | 0.16 |
| 14 | A2 | B1 | C3 | D1 | E2 | F1 | G2 | — | 0.80 | 2 | 0.09 | 0.16 |
| 15 | A2 | B1 | C3 | D1 | E2 | F1 | G2 | — | 1.10 | 2.4 | 0.09 | 0.16 |
| 16 | A2 | B2 | C3 | D1 | E3 | F1 | G1 | — | 0.60 | 1.2 | 0.03 | 0.12 |
| 17 | A2 | B2 | C3 | D1 | E3 | F1 | G1 | — | 0.60 | 1.2 | 0.04 | 0.12 |
| 18 | A2 | B2 | C3 | D1 | E3 | F1 | G1 | — | 0.60 | 1.2 | 0.06 | 0.12 |
| 19 | A2 | B2 | C3 | D1 | E3 | F1 | G1 | — | 0.60 | 1.2 | 0.11 | 0.12 |
| 20 | A2 | B2 | C3 | D1 | E3 | F1 | G1 | — | 0.60 | 1.2 | 0.13 | 0.12 |

| | Proportion *2 *3 |||| | |
|---|---|---|---|---|---|---|
| No. | (F)/(A) | (SI)/(A) | (G)/(X) | (H)/(X) | pH | Category |
| 1 | 0.020 | 0.27 | 0.04 | — | 8.6 | Invention example |
| 2 | 0.020 | 0.32 | 0.04 | — | 8.6 | Invention example |
| 3 | 0.020 | 0.44 | 0.04 | — | 8.6 | Invention example |
| 4 | 0.020 | 0.62 | 0.04 | — | 8.6 | Invention example |
| 5 | 0.020 | 0.72 | 0.04 | — | 8.6 | Invention example |
| 6 | 0.020 | 0.40 | 0.04 | — | 8.2 | Invention example |
| 7 | 0.020 | 0.46 | 0.04 | — | 8.2 | Invention example |
| 8 | 0.020 | 0.52 | 0.04 | — | 8.2 | Invention example |
| 9 | 0.020 | 0.59 | 0.04 | — | 8.2 | Invention example |
| 10 | 0.020 | 0.64 | 0.04 | — | 8.2 | Invention example |
| 11 | 0.020 | 0.20 | 0.04 | — | 8.2 | Invention example |
| 12 | 0.020 | 0.28 | 0.04 | — | 8.2 | Invention example |
| 13 | 0.020 | 0.52 | 0.04 | — | 8.2 | Invention example |
| 14 | 0.020 | 0.69 | 0.04 | — | 8.2 | Invention example |
| 15 | 0.020 | 0.89 | 0.04 | — | 8.2 | Invention example |
| 16 | 0.020 | 0.47 | 0.04 | — | 8.5 | Invention example |
| 17 | 0.020 | 0.47 | 0.04 | — | 8.5 | Invention example |
| 18 | 0.020 | 0.47 | 0.04 | — | 8.5 | Invention example |
| 19 | 0.020 | 0.47 | 0.04 | — | 8.5 | Invention example |
| 20 | 0.020 | 0.47 | 0.04 | — | 8.5 | Invention example |

*1 (A): Water-soluble zirconium compound
(B): Water-dispersive particulate silica
(C): Silane coupling agent
(D): Vanadium compound
(E): Phosphoric acid compound
(F): Nickel compound
(G): Acrylic resin emulsion
(H): Wax
*2 (A): Amount of water-soluble zirconium compound on zirconium basis
(B): Amount of water-dispersive particulate silica (solid content)
(C): Amount of silane coupling agent (solid content)
(D): Amount of vanadium compound on vanadium basis
(E): Amount of phosphoric acid compound on phosphorus basis
(F): Amount of nickel compound on nickel basis
(G): Amount of acrylic resin emulsion (solid content)
(SI): Total amount of water-dispersive particulate silica and silane coupling agent on silicon basis
(X): Total solid content of treatment liquid
*3 Proportions are expressed in mass ratio.

TABLE 11

| | Aqueous surface-treatment liquid | | | | | | | | | | | |
|---|---|---|---|---|---|---|---|---|---|---|---|---|
| | Component *1 *4 | | | | | | | | Proportion *2 *3 | | | |
| No. | (A) | (B) | (C) | (D) | (E) | (F) | (G) | (H) | (B)/(A) | (C)/(A) | (D)/(A) | (E)/(A) |
| 21 | A2 | B3 | C1 + C3 | D1 | E2 | F1 | G1 | — | 0.70 | 1.2 | 0.06 | 0.04 |
| 22 | A2 | B3 | C1 + C3 | D1 | E2 | F1 | G1 | — | 0.70 | 1.2 | 0.06 | 0.07 |
| 23 | A2 | B3 | C1 + C3 | D1 | E2 | F1 | G1 | — | 0.70 | 1.2 | 0.06 | 0.12 |
| 24 | A2 | B3 | C1 + C3 | D1 | E2 | F1 | G1 | — | 0.70 | 1.2 | 0.06 | 0.19 |
| 25 | A2 | B3 | C1 + C3 | D1 | E2 | F1 | G1 | — | 0.70 | 1.2 | 0.06 | 0.24 |
| 26 | A2 | B2 | C1 | D2 | E2 + E3 | F2 | G1 | — | 0.60 | 1.6 | 0.09 | 0.12 |
| 27 | A2 | B2 | C1 | D2 | E2 + E3 | F2 | G1 | — | 0.60 | 1.6 | 0.09 | 0.12 |
| 28 | A2 | B2 | C1 | D2 | E2 + E3 | F2 | G1 | — | 0.60 | 1.6 | 0.09 | 0.12 |
| 29 | A2 | B2 | C1 | D2 | E2 + E3 | F2 | G1 | — | 0.60 | 1.6 | 0.09 | 0.12 |
| 30 | A2 | B2 | C1 | D2 | E2 + E3 | F2 | G1 | — | 0.60 | 1.6 | 0.09 | 0.12 |
| 31 | A2 | B2 | C1 | D2 | E2 | F1 | G1 | — | 0.65 | 1.6 | 0.09 | 0.12 |
| 32 | A2 | B2 | C1 | D2 | E2 | F1 | G1 | — | 0.65 | 1.6 | 0.09 | 0.12 |
| 33 | A2 | B4 | C1 | D2 | E2 | F1 | G1 | — | 0.65 | 1.6 | 0.09 | 0.12 |
| 34 | A2 | B4 | C1 | D2 | E2 | F1 | G1 | — | 0.65 | 1.6 | 0.09 | 0.12 |
| 35 | A2 | B4 | C1 | D2 | E2 | F1 | G1 | — | 0.65 | 1.6 | 0.09 | 0.12 |
| 36 | A2 | B4 | C1 | D2 | E2 | F1 | G3 | — | 0.65 | 1.6 | 0.09 | 0.12 |
| 37 | A2 | B4 | C1 | D2 | E2 | F1 | G4 | — | 0.65 | 1.6 | 0.09 | 0.12 |
| 38 | A2 | B1 | C2 | D1 | E2 | F1 | G2 | — | 0.70 | 1.6 | 0.09 | 0.16 |
| 39 | A2 | B1 | C2 | D1 | E2 | F1 | G2 | — | 0.70 | 1.6 | 0.09 | 0.16 |
| 40 | A2 | B1 | C2 | D1 | E2 | F1 | G2 | H1 | 0.70 | 1.6 | 0.09 | 0.16 |

| | Proportion *2 *3 | | | | | |
|---|---|---|---|---|---|---|
| No. | (F)/(A) | (SI)/(A) | (G)/(X) | (H)/(X) | pH | Category |
| 21 | 0.020 | 0.50 | 0.04 | — | 8.4 | Invention example |
| 22 | 0.020 | 0.50 | 0.04 | — | 8.4 | Invention example |
| 23 | 0.020 | 0.50 | 0.04 | — | 8.4 | Invention example |
| 24 | 0.020 | 0.50 | 0.04 | — | 8.4 | Invention example |
| 25 | 0.020 | 0.50 | 0.04 | — | 8.4 | Invention example |
| 26 | 0.007 | 0.48 | 0.04 | — | 9.3 | Invention example |
| 27 | 0.015 | 0.48 | 0.04 | — | 9.3 | Invention example |
| 28 | 0.050 | 0.48 | 0.04 | — | 9.3 | Invention example |
| 29 | 0.070 | 0.48 | 0.04 | — | 9.3 | Invention example |
| 30 | 0.090 | 0.48 | 0.04 | — | 9.3 | Invention example |
| 31 | 0.020 | 0.51 | 0.005 | — | 9.0 | Invention example |
| 32 | 0.020 | 0.51 | 0.01 | — | 9.0 | Invention example |
| 33 | 0.020 | 0.51 | 0.05 | — | 9.0 | Invention example |
| 34 | 0.020 | 0.51 | 0.15 | — | 9.0 | Invention example |
| 35 | 0.020 | 0.51 | 0.17 | — | 9.0 | Invention example |
| 36 | 0.020 | 0.51 | 0.09 | — | 9.0 | Invention example |
| 37 | 0.020 | 0.51 | 0.09 | — | 9.0 | Invention example |
| 38 | 0.020 | 0.52 | 0.04 | — | 6.0 | Invention example |
| 39 | 0.020 | 0.52 | 0.04 | — | 10.5 | Invention example |
| 40 | 0.020 | 0.52 | 0.04 | 0.05 | 8.2 | Invention example |

*1 (A): Water-soluble zirconium compound
(B): Water-dispersive particulate silica
(C): Silane coupling agent
(D): Vanadium compound
(E): Phosphoric acid compound
(F): Nickel compound
(G): Acrylic resin emulsion
(H): Wax
*2 (A): Amount of water-soluble zirconium compound on zirconium basis
(B): Amount of water-dispersive particulate silica (solid content)
(C): Amount of silane coupling agent (solid content)
(D): Amount of vanadium compound on vanadium basis
(E): Amount of phosphoric acid compound on phosphorus basis
(F): Amount of nickel compound on nickel basis
(G): Amount of acrylic resin emulsion (solid content)
(SI): Total amount of water-dispersive particulate silica and silane coupling agent on silicon basis
(X): Total solid content of treatment liquid
*3 Proportions are expressed in mass ratio.
*4 C1 + C3 and E2 + E3 were each added in mass ratio of 1:1.

TABLE 12

| | Aqueous surface-treatment liquid | | | | | | | | | | | |
|---|---|---|---|---|---|---|---|---|---|---|---|---|
| | Component *1 *4 | | | | | | | | Proportion *2 *3 | | | |
| No. | (A) | (B) | (C) | (D) | (E) | (F) | (G) | (H) | (B)/(A) | (C)/(A) | (D)/(A) | (E)/(A) |
| 41 | A1 | B1 | C1 | D1 | E1 | F1 | G1 | — | 0.05 | 1.6 | 0.06 | 0.12 |
| 42 | A1 | B1 | C1 | D1 | E1 | F1 | G1 | — | 1.50 | 1.6 | 0.09 | 0.12 |
| 43 | A2 | B1 | C2 | D1 | E2 | F1 | G2 | — | 0.70 | 0.3 | 0.09 | 0.16 |
| 44 | A2 | B1 | C2 | D1 | E2 | F1 | G2 | — | 0.70 | 3.5 | 0.09 | 0.16 |
| 45 | A2 | B1 | C2 | D1 | E2 | F1 | G2 | — | 0.15 | 0.5 | 0.09 | 0.16 |
| 46 | A2 | B1 | C3 | D1 | E2 | F1 | G2 | — | 1.20 | 3 | 0.09 | 0.16 |
| 47 | A2 | B2 | C3 | D1 | E3 | F1 | G1 | — | 0.60 | 1.2 | 0.01 | 0.12 |
| 48 | A2 | B2 | C3 | D1 | E3 | F1 | G1 | — | 0.60 | 1.6 | 0.20 | 0.12 |
| 49 | A2 | B3 | C1 + C3 | D1 | E2 | F1 | G1 | — | 0.70 | 1.2 | 0.06 | 0.01 |
| 50 | A2 | B3 | C1 + C3 | D1 | E2 | F1 | G1 | — | 0.60 | 1.6 | 0.09 | 0.40 |
| 51 | A2 | B2 | C1 | D2 | E2 + E3 | F2 | G1 | — | 0.60 | 1.6 | 0.09 | 0.12 |
| 52 | A2 | B2 | C1 | D2 | E2 + E3 | F2 | G1 | — | 0.60 | 1.6 | 0.09 | 0.12 |
| 53 | A2 | B2 | C1 | D2 | E2 | F1 | — | — | 0.65 | 1.6 | 0.09 | 0.12 |
| 54 | A2 | B2 | C1 | D2 | E2 | F1 | G1 | — | 0.60 | 1.6 | 0.09 | 0.12 |
| 55 | A2 | B1 | C2 | D3 | E2 | F1 | G2 | — | 0.70 | 1.6 | 0.09 | 0.16 |

| | Proportion *2 *3 | | | | | |
|---|---|---|---|---|---|---|
| No. | (F)/(A) | (SI)/(A) | (G)/(X) | (H)/(X) | pH | Category |
| 41 | 0.020 | 0.23 | 0.04 | — | 8.6 | Comparative example |
| 42 | 0.020 | 0.90 | 0.04 | — | 8.6 | Comparative example |
| 43 | 0.020 | 0.36 | 0.04 | — | 8.2 | Comparative example |
| 44 | 0.020 | 0.74 | 0.04 | — | 8.2 | Comparative example |
| 45 | 0.020 | 0.13 | 0.04 | — | 8.2 | Comparative example |
| 46 | 0.020 | 1.03 | 0.04 | — | 8.2 | Comparative example |
| 47 | 0.020 | 0.47 | 0.04 | — | 8.5 | Comparative example |
| 48 | 0.020 | 0.53 | 0.04 | — | 8.5 | Comparative example |
| 49 | 0.020 | 0.50 | 0.04 | — | 8.4 | Comparative example |
| 50 | 0.020 | 0.51 | 0.04 | — | 8.4 | Comparative example |
| 51 | 0.001 | 0.48 | 0.04 | — | 9.3 | Comparative example |
| 52 | 0.200 | 0.48 | 0.04 | — | 9.3 | Comparative example |
| 53 | 0.020 | 0.51 | 0 | — | 9.0 | Comparative example |
| 54 | 0.020 | 0.48 | 0.20 | — | 9.0 | Comparative example |
| 55 | 0.020 | 0.52 | 0.04 | — | 8.2 | Comparative example |

*1 (A): Water-soluble zirconium compound
(B): Water-dispersive particulate silica
(C): Silane coupling agent
(D): Vanadium compound
(E): Phosphoric acid compound
(F): Nickel compound
(G): Acrylic resin emulsion
(H): Wax
*2 (A): Amount of water-soluble zirconium compound on zirconium basis
(B): Amount of water-dispersive particulate silica (solid content)
(C): Amount of silane coupling agent (solid content)
(D): Amount of vanadium compound on vanadium basis
(E): Amount of phosphoric acid compound on phosphorus basis
(F): Amount of nickel compound on nickel basis
(G): Amount of acrylic resin emulsion (solid content)
(SI): Total amount of water-dispersive particulate silica and silane coupling agent on silicon basis
(X): Total solid content of treatment liquid
*3 Proportions are expressed in mass ratio.
*4 C1 + C3 and E2 + E3 were each added in mass ratio of 1:1.

TABLE 13

| No. | (A) | (B) | (C) | (D) | (E) | (F) | (G) | (H) | (B)/(A) | (C)/(A) | (D)/(A) | (E)/(A) |
|---|---|---|---|---|---|---|---|---|---|---|---|---|
| 56 | A2 | B1 | C2 | D1 | E2 | F1 | G2 | H1 | 0.70 | 1.6 | 0.09 | 0.16 |
| 57 | A2 | B1 | C2 | D1 | E2 | F1 | G2 | H2 | 0.70 | 1.6 | 0.09 | 0.16 |
| 58 | A2 | B1 | C2 | D1 | E2 | F1 | G2 | H3 | 0.70 | 1.6 | 0.09 | 0.16 |
| 59 | A2 | B1 | C2 | D1 | E2 | F1 | G2 | H4 | 0.70 | 1.6 | 0.09 | 0.16 |
| 60 | A2 | B1 | C2 | D1 | E2 | F1 | G2 | H4 | 0.70 | 1.6 | 0.09 | 0.16 |
| 61 | A2 | B1 | C2 | D1 | E2 | F1 | G2 | H4 | 0.70 | 1.6 | 0.09 | 0.16 |
| 62 | A2 | B1 | C2 | D1 | E2 | F1 | G2 | H4 | 0.70 | 1.6 | 0.09 | 0.16 |
| 63 | A2 | B1 | C2 | D1 | E2 | F1 | G2 | H4 | 0.70 | 1.6 | 0.09 | 0.16 |

| No. | (F)/(A) | (SI)/(A) | (G)/(X) | (H)/(X) | pH | Category |
|---|---|---|---|---|---|---|
| 56 | 0.020 | 0.52 | 0.04 | 0.1 | 8.6 | Invention example |
| 57 | 0.020 | 0.52 | 0.04 | 0.1 | 8.6 | Invention example |
| 58 | 0.020 | 0.52 | 0.04 | 0.1 | 8.6 | Invention example |
| 59 | 0.020 | 0.52 | 0.04 | 0 | 8.6 | Invention example |
| 60 | 0.020 | 0.52 | 0.04 | 0 | 8.6 | Invention example |
| 61 | 0.020 | 0.52 | 0.04 | 0.1 | 8.6 | Invention example |
| 62 | 0.020 | 0.52 | 0.04 | 0.1 | 8.6 | Invention example |
| 63 | 0.020 | 0.52 | 0.04 | 0.1 | 8.6 | Invention example |

*1 (A): Water-soluble zirconium compound
(B): Water-dispersive particulate silica
(C): Silane coupling agent
(D): Vanadium compound
(E): Phosphoric acid compound
(F): Nickel compound
(G): Acrylic resin emulsion
(H): Wax
*2 (A): Amount of water-soluble zirconium compound on zirconium basis
(B): Amount of water-dispersive particulate silica (solid content)
(C): Amount of silane coupling agent (solid content)
(D): Amount of vanadium compound on vanadium basis
(E): Amount of phosphoric acid compound on phosphorus basis
(F): Amount of nickel compound on nickel basis
(G): Amount of acrylic resin emulsion (solid content)
(SI): Total amount of water-dispersive particulate silica and silane coupling agent on silicon basis
(X): Total solid content of treatment liquid
*3 Proportions are expressed in mass ratio.
*4 C1 + C3 and E2 + E3 were each added in mass ratio of 1:1.

TABLE 14

| No. | Treatment liquid *1 | Galvanized steel sheet *2 | Coating composition (Si)/(a) *3 *4 | Coating composition Amount of coating on Zr basis (mg/m$^2$) | Coating composition Coating thickness (μm) | Drying temperature (°C.) *5 |
|---|---|---|---|---|---|---|
| 1 | 1 | 1 | 0.27 | 80 | 0.2 | 80 |
| 2 | 2 | 1 | 0.32 | 80 | 0.3 | 80 |
| 3 | 3 | 1 | 0.44 | 80 | 0.3 | 80 |
| 4 | 4 | 1 | 0.62 | 80 | 0.3 | 80 |
| 5 | 5 | 1 | 0.72 | 80 | 0.4 | 80 |
| 6 | 6 | 1 | 0.40 | 80 | 0.2 | 140 |
| 7 | 7 | 1 | 0.46 | 80 | 0.3 | 140 |
| 8 | 8 | 1 | 0.52 | 80 | 0.3 | 140 |
| 9 | 9 | 1 | 0.59 | 80 | 0.4 | 140 |
| 10 | 10 | 1 | 0.64 | 80 | 0.4 | 140 |
| 11 | 11 | 1 | 0.20 | 80 | 0.2 | 120 |
| 12 | 12 | 1 | 0.28 | 80 | 0.2 | 120 |
| 13 | 13 | 1 | 0.52 | 80 | 0.3 | 120 |
| 14 | 14 | 1 | 0.69 | 80 | 0.4 | 120 |
| 15 | 15 | 1 | 0.89 | 80 | 0.5 | 120 |
| 16 | 16 | 1 | 0.47 | 80 | 0.2 | 100 |
| 17 | 17 | 1 | 0.47 | 80 | 0.2 | 100 |
| 18 | 18 | 1 | 0.47 | 80 | 0.2 | 100 |
| 19 | 19 | 1 | 0.47 | 80 | 0.3 | 100 |
| 20 | 20 | 1 | 0.47 | 80 | 0.3 | 100 |
| 21 | 21 | 1 | 0.50 | 80 | 0.2 | 70 |
| 22 | 22 | 1 | 0.50 | 80 | 0.3 | 70 |

TABLE 14-continued

| | | | | | | |
|---|---|---|---|---|---|---|
| 23 | 23 | 1 | 0.50 | 80 | 0.3 | 70 |
| 24 | 24 | 1 | 0.50 | 80 | 0.3 | 70 |

| | Quality performance | | | | |
|---|---|---|---|---|---|
| | Flat-portion | | After press forming | | |
| No. | corrosion resistance | Blackening resistance | Appearance | Corrosion resistance | Category |
| 1 | B | A | B | B | Invention example |
| 2 | B or A | A | B | B | Invention example |
| 3 | A | A | A | A | Invention example |
| 4 | B or A | A | A | B | Invention example |
| 5 | B | A | A | B | Invention example |
| 6 | A | A | B | B | Invention example |
| 7 | A | A | B or A | B | Invention example |
| 8 | A | A | A | A | Invention example |
| 9 | B or A | A | A | B | Invention example |
| 10 | B | A | A | B | Invention example |
| 11 | B | A | B | B | Invention example |
| 12 | A | A | B or A | B | Invention example |
| 13 | A | A | A | A | Invention example |
| 14 | B or A | A | A | B | Invention example |
| 15 | B | A | A | B | Invention example |
| 16 | B | A | A | B | Invention example |
| 17 | B or A | A | A | B | Invention example |
| 18 | A | A | A | A | Invention example |
| 19 | A | A | B or A | A | Invention example |
| 20 | A | B | B | A | Invention example |
| 21 | B | A | A | B− | Invention example |
| 22 | B | A | A | B | Invention example |
| 23 | A | A | A | A | Invention example |
| 24 | A | B | A | A | Invention example |

*1 Treatment Liquid No. in Tables 10-13
*2 Galvanized Steel Sheet No. in Table 1
*3 (a): Amount of zirconium compound on zirconium basis
(Si): Total amount of particulate silica (b) and silane-coupling-agent-derived component (c) on silicon basis
*4 Mass ratio
*5 Peak metal temperature

TABLE 15

| | | | Coating composition | | | Drying |
|---|---|---|---|---|---|---|
| No. | Treatment liquid *1 | Galvanized steel sheet *2 | (Si)/(a) *3 *4 | Amount of coating on Zr basis (mg/m$^2$) | Coating thickness (μm) | temperature (° C.) *5 |
| 25 | 25 | 1 | 0.50 | 80 | 0.3 | 70 |
| 26 | 26 | 1 | 0.48 | 80 | 0.3 | 80 |
| 27 | 27 | 1 | 0.48 | 80 | 0.3 | 80 |
| 28 | 28 | 1 | 0.48 | 80 | 0.3 | 80 |
| 29 | 29 | 1 | 0.48 | 80 | 0.3 | 80 |
| 30 | 30 | 1 | 0.48 | 80 | 0.3 | 80 |
| 31 | 31 | 1 | 0.51 | 80 | 0.3 | 80 |
| 32 | 32 | 1 | 0.51 | 80 | 0.3 | 80 |
| 33 | 33 | 1 | 0.51 | 80 | 0.3 | 80 |
| 34 | 34 | 1 | 0.51 | 80 | 0.3 | 80 |
| 35 | 35 | 1 | 0.51 | 80 | 0.3 | 80 |
| 36 | 36 | 1 | 0.51 | 80 | 0.3 | 80 |
| 37 | 37 | 1 | 0.51 | 80 | 0.3 | 80 |
| 38 | 38 | 1 | 0.52 | 80 | 0.3 | 80 |
| 39 | 39 | 1 | 0.52 | 80 | 0.3 | 80 |
| 40 | 40 | 1 | 0.52 | 80 | 0.3 | 80 |
| 41 | 8 | 1 | 0.52 | 15 | 0.06 | 80 |
| 42 | 8 | 1 | 0.52 | 25 | 0.1 | 80 |
| 43 | 8 | 1 | 0.52 | 35 | 0.1 | 80 |
| 44 | 8 | 1 | 0.52 | 50 | 0.2 | 80 |
| 45 | 8 | 1 | 0.52 | 160 | 0.6 | 80 |
| 46 | 8 | 1 | 0.52 | 190 | 0.7 | 80 |
| 47 | 3 | 1 | 0.44 | 80 | 0.3 | 52 |
| 48 | 3 | 1 | 0.44 | 80 | 0.3 | 140 |
| 49 | 3 | 1 | 0.44 | 80 | 0.3 | 190 |

TABLE 15-continued

| | Quality performance | | | | |
|---|---|---|---|---|---|
| | Flat-portion | | After press forming | | |
| No. | corrosion resistance | Blackening resistance | Appearance | Corrosion resistance | Category |
| 25 | A | B− | B | B | Invention example |
| 26 | A | B | A | A | Invention example |
| 27 | A | B or A | A | A | Invention example |
| 28 | A | A | A | A | Invention example |
| 29 | B or A | A | A | B | Invention example |
| 30 | B | A | B | B− | Invention example |
| 31 | B− | A | A | B− | Invention example |
| 32 | B | A | A | B | Invention example |
| 33 | A | A | A | A | Invention example |
| 34 | A | B | B | A | Invention example |
| 35 | A | B | B− | B | Invention example |
| 36 | B | B | B− | B− | Invention example |
| 37 | B− | B | B | B− | Invention example |
| 38 | B | B | B | B− | Invention example |
| 39 | B | B | B | B− | Invention example |
| 40 | A | A | A | A | Invention example |
| 41 | B | B | A | B− | Invention example |
| 42 | B | B | A | B | Invention example |
| 43 | A | A | A | A | Invention example |
| 44 | A | A | A | A | Invention example |
| 45 | A | A | B | A | Invention example |
| 46 | A | A | B− | A | Invention example |
| 47 | B | A | B | B | Invention example |
| 48 | A | A | A | A | Invention example |
| 49 | A | A | A | B | Invention example |

*1 Treatment Liquid No. in Tables 10-13
*2 Galvanized Steel Sheet No. in Table 1
*3 (a): Amount of zirconium compound on zirconium basis
(Si): Total amount of particulate silica (b) and silane-coupling-agent-derived component (c) on silicon basis
*4 Mass ratio
*5 Peak metal temperature

TABLE 16

| No. | Treatment liquid *1 | Galvanized steel sheet *2 | Coating composition | | | Drying temperature (° C.) *5 |
|---|---|---|---|---|---|---|
| | | | (Si)/(a) *3 *4 | Amount of coating on Zr basis (mg/m$^2$) | Coating thickness (μm) | |
| 50 | 3 | 1 | 0.44 | 80 | 0.3 | 240 |
| 51 | 3 | 2 | 0.44 | 80 | 0.3 | 80 |
| 52 | 3 | 3 | 0.44 | 80 | 0.3 | 80 |
| 53 | 3 | 4 | 0.44 | 80 | 0.3 | 100 |
| 54 | 3 | 5 | 0.44 | 80 | 0.3 | 80 |
| 55 | 3 | 6 | 0.44 | 80 | 0.3 | 80 |
| 56 | 41 | 1 | 0.23 | 80 | 0.2 | 80 |
| 57 | 42 | 1 | 0.90 | 80 | 0.4 | 80 |
| 58 | 43 | 1 | 0.36 | 80 | 0.2 | 140 |
| 59 | 44 | 1 | 0.74 | 80 | 0.5 | 140 |
| 60 | 45 | 1 | 0.13 | 80 | 0.1 | 120 |
| 61 | 46 | 1 | 1.03 | 80 | 0.5 | 120 |
| 62 | 47 | 1 | 0.47 | 80 | 0.2 | 100 |
| 63 | 48 | 1 | 0.53 | 80 | 0.3 | 100 |
| 64 | 49 | 1 | 0.50 | 80 | 0.2 | 70 |
| 65 | 50 | 1 | 0.51 | 80 | 0.3 | 70 |
| 66 | 51 | 1 | 0.48 | 80 | 0.3 | 80 |
| 67 | 52 | 1 | 0.48 | 80 | 0.3 | 80 |
| 68 | 53 | 1 | 0.51 | 80 | 0.3 | 80 |
| 69 | 54 | 1 | 0.48 | 80 | 0.3 | 80 |
| 70 | 55 | 1 | 0.52 | 80 | 0.3 | 80 |
| 71 | 8 | 1 | 0.52 | 4 | 0.01 | 80 |
| 72 | 8 | 1 | 0.52 | 300 | 1.0 | 80 |

TABLE 16-continued

| | Quality performance | | | | |
|---|---|---|---|---|---|
| | Flat-portion | | After press forming | | |
| No. | corrosion resistance | Blackening resistance | Appearance | Corrosion resistance | Category |
| 50 | B | A | A | B | Invention example |
| 51 | A | B | A | A | Invention example |
| 52 | A | B | A | A | Invention example |
| 53 | A | A | A | A | Invention example |
| 54 | A | B | A | A | Invention example |
| 55 | A | B | A | A | Invention example |
| 56 | C | A | D | C | Comparative example |
| 57 | D | A | A | D | Comparative example |
| 58 | C | A | C | C | Comparative example |
| 59 | D | A | A | D | Comparative example |
| 60 | C | A | C | C | Comparative example |
| 61 | D | A | A | D | Comparative example |
| 62 | D | B | A | D | Comparative example |
| 63 | A | D | B | B | Comparative example |
| 64 | C | A | A | D | Comparative example |
| 65 | B | D | B | B | Comparative example |
| 66 | A | D | A | B | Comparative example |
| 67 | D | A | B | D | Comparative example |
| 68 | D | A | A | D | Comparative example |
| 69 | A | A | D | C | Comparative example |
| 70 | C | C | A | D | Comparative example |
| 71 | D | C | A | D | Comparative example |
| 72 | C | A | D | D | Comparative example |

*1 Treatment Liquid No. in Tables 10-13
*2 Galvanized Steel Sheet No. in Table 1
*3 (a): Amount of zirconium compound on zirconium basis
(Si): Total amount of particulate silica (b) and silane-coupling-agent-derived component (c) on silicon basis
*4 Mass ratio
*5 Peak metal temperature

TABLE 17

| | | | Coating composition | | | Drying |
|---|---|---|---|---|---|---|
| No. | Treatment liquid *1 | Galvanized steel sheet *2 | (Si)/(a) *3 *4 | Amount of coating on Zr basis (mg/m$^2$) | Coating thickness (μm) | temperature (° C.) *5 |
| 73 | 56 | 1 | 0.52 | 80 | 0.3 | 140 |
| 74 | 57 | 1 | 0.52 | 80 | 0.3 | 140 |
| 75 | 58 | 1 | 0.52 | 80 | 0.3 | 140 |
| 76 | 59 | 1 | 0.52 | 80 | 0.3 | 140 |
| 77 | 60 | 1 | 0.52 | 80 | 0.3 | 140 |
| 78 | 61 | 1 | 0.52 | 80 | 0.3 | 140 |
| 79 | 62 | 1 | 0.52 | 80 | 0.3 | 140 |
| 80 | 63 | 1 | 0.52 | 50 | 0.3 | 80 |

| | Quality performance | | | | |
|---|---|---|---|---|---|
| | Flat-portion | | After press forming | | |
| No. | corrosion resistance | Blackening resistance | Appearance | Corrosion resistance | Category |
| 73 | A | A | A+ | A | Invention example |
| 74 | A | A | A+ | A | Invention example |
| 75 | A | A | A+ | A | Invention example |
| 76 | A | A | A | A | Invention example |
| 77 | A | A | A+ | A | Invention example |
| 78 | A | A | A+ | A | Invention example |
| 79 | B or A | A | A+ | B or A | Invention example |
| 80 | B | A | A+ | B | Invention example |

*1 Treatment Liquid No. in Tables 10-13
*2 Galvanized Steel Sheet No. in Table 1
*3 (a): Amount of zirconium compound on zirconium basis
(Si): Total amount of particulate silica (b) and silane-coupling-agent-derived component (c) on silicon basis
*4 Mass ratio
*5 Peak metal temperature

INDUSTRIAL APPLICABILITY

The surface-treated galvanized steel sheet of the present invention has a coating free of environmentally controlled substances such as hexavalent chromium and has superior flat-portion corrosion resistance, blackening resistance, and appearance and corrosion resistance after press forming. This surface-treated galvanized steel sheet is therefore suitable for components, such as motor cases, of automobiles, household electric appliances, and office automation equipment.

In addition, such a surface-treated galvanized steel sheet can be stably produced by means of the aqueous surface-treatment liquid of the present invention for galvanized steel sheets and the method for producing a surface-treated galvanized steel sheet using the aqueous surface-treatment liquid.

The invention claimed is:

1. An aqueous surface-treatment liquid for a galvanized steel sheet having superior flat-portion corrosion resistance, blackening resistance, and appearance and corrosion resistance after press forming, comprising a water-soluble zirconium compound (A) selected from the group consisting of sodium zirconium carbonate and ammonium zirconium carbonate; water-dispersive particulate silica (B); a silane coupling agent (C) selected from the group consisting of γ-aminopropyltriethoxysilane, γ-glycidoxypropyltrimethoxysilane and γ-aminopropyltrimethoxysilane; a vanadic acid compound (D) selected from the group consisting of sodium vanadate and ammonium vanadate; a phosphoric acid compound (E) selected from the group consisting of phosphoric acid, ammonium phosphate and diphosphonic acid; a nickel compound (F) selected from the group consisting of nickel nitrate hexahydrate and nickel sulfate hexahydrate; and an acrylic resin emulsion (G) selected from the group consisting of styrene-ethylmethyacrylate-n-butylacrylate-acrylic acid and methylmethacrylate-2-ethylhexylacrylate-acrylic acid, so as to satisfy the following conditions (1) to (7):
   (1) the mass ratio (B)/(A) of the amount of water-dispersive particulate silica (B) to the amount of water-soluble zirconium compound (A) on a zirconium basis=0.1 to 1.2;
   (2) the mass ratio (C)/(A) of the amount of silane coupling agent (C) to the amount of water-soluble zirconium compound (A) on a zirconium basis=0.5 to 3.0;
   (3) the mass ratio (D)/(A) of the amount of vanadic acid compound (D) on a vanadium basis to the amount of water-soluble zirconium compound (A) on a zirconium basis=0.02 to 0.15;
   (4) the mass ratio (E)/(A) of the amount of phosphoric acid compound (E) on a phosphorus basis to the amount of water-soluble zirconium compound (A) on a zirconium basis=0.03 to 0.30;
   (5) the mass ratio (F)/(A) of the amount of nickel compound (F) on a nickel basis to the amount of the water-soluble zirconium compound (A) on a zirconium basis=0.005 to 0.10;
   (6) the mass ratio (SI)/(A) of the total amount (SI) of water-dispersive particulate silica (B) and silane coupling agent (C) on a silicon basis to the amount of water-soluble zirconium compound (A) on a zirconium basis=0.15 to 1.0; and
   (7) the mass ratio (G)/(X) of the solid content of the acrylic resin emulsion (G) to the total solid content (X) of the aqueous surface-treatment liquid=0.005 to 0.18.

2. The aqueous surface-treatment liquid for a galvanized steel sheet according to claim 1, further comprising a wax (H) so as to satisfy the following condition (8):
   (8) the mass ratio (H)/(X) of the solid content of the wax (H) to the total solid content (X) of the aqueous surface-treatment liquid=0.01 to 0.10.

3. A method for producing a surface-treated galvanized steel sheet having superior flat-portion corrosion resistance, blackening resistance, and appearance and corrosion resistance after press forming, the method comprising applying the aqueous surface-treatment liquid according to claim 1 to a surface of a galvanized steel sheet so that the amount of coating on a zirconium basis is 10 to 200 mg/m$^2$ and drying the coating.

4. A surface-treated galvanized steel sheet having superior flat-portion corrosion resistance, blackening resistance, and appearance and corrosion resistance after press forming, comprising a galvanized steel sheet having a surface-treatment coating on a surface thereof, the coating containing a zirconium compound (a) selected from the group consisting of sodium zirconium carbonate and ammonium zirconium carbonate; particulate silica (b); a silane coupling-agent-derived component (c) selected from the group consisting of γ-aminopropyltriethoxysilane, γ-glycidoxypropyltrimethoxysilane and γ-aminopropyltrimethoxysilane; a vanadic acid compound (d) selected from the group consisting of sodium vanadate and ammonium vanadate; a phosphoric acid compound (e) selected from the group consisting of phosphoric acid, ammonium phosphate and diphosphonic acid; a nickel compound (f) selected from the group consisting of nickel nitrate hexahydrate and nickel sulfate hexahydrate; and an acrylic resin (g) selected from the group consisting of styrene-ethylmethyacrylate-n-butylacrylate-acrylic acid and methylmethacrylate-2-ethylhexylacrylate-acrylic acid, so as to satisfy the following conditions (1) to (7):
   (1) the mass ratio (b)/(a) of the amount of particulate silica (b) to the amount of zirconium compound (a) on a zirconium basis=0.1 to 1.2;
   (2) the mass ratio (Si)/(a) of the total amount (Si) of particulate silica (b) and silane-coupling-agent-derived component (c) on a silicon basis to the amount of zirconium compound (a) on a zirconium basis=0.15 to 1.0;
   (3) the mass ratio (d)/(a) of the amount of vanadic acid compound (d) on a vanadium basis to the amount of zirconium compound (a) on a zirconium basis=0.02 to 0.15;
   (4) the mass ratio (e)/(a) of the amount of phosphoric acid compound (e) on a phosphorus basis to the amount of zirconium compound (a) on a zirconium basis=0.03 to 0.30;
   (5) the mass ratio (f)/(a) of the amount of nickel compound (f) on a nickel basis to the amount of zirconium compound (a) on a zirconium basis=0.005 to 0.10;
   (6) the mass ratio (g)/(x) of the amount of acrylic resin (g) to the total solid content (x) of the coating=0.005 to 0.18; and
   (7) the mass ratio (c)/(a) of the amount of the silane-coupling-agent-derived component (c) to the amount of zirconium compound (a) on a zirconium basis=0.5 to 3.0;
   wherein the amount of coating on a zirconium basis is 10 to 200 mg/m$^2$.

5. The surface-treated galvanized steel sheet having superior flat-portion corrosion resistance, blackening resistance, and appearance and corrosion resistance after press forming according to claim 4, wherein the surface-treatment coating further contains a wax (h) so as to satisfy the following condition (7):
   (7) the mass ratio (h)/(x) of the amount of wax (h) to the total solid content (x) of the coating=0.01 to 0.10.

6. A method for producing a surface-treated galvanized steel sheet having superior flat-portion corrosion resistance, blackening resistance, and appearance and corrosion resistance after press forming, the method comprising applying the aqueous surface-treatment liquid according to claim 2 to a surface of a galvanized steel sheet so that the amount of coating on a zirconium basis is 10 to 200 mg/m$^2$ and drying the coating.

* * * * *

UNITED STATES PATENT AND TRADEMARK OFFICE
CERTIFICATE OF CORRECTION

PATENT NO. : 8,304,092 B2
APPLICATION NO. : 12/311383
DATED : November 6, 2012
INVENTOR(S) : Kazuhisa Okai Page 1 of 1

It is certified that error appears in the above-identified patent and that said Letters Patent is hereby corrected as shown below:

Column 31, Line 34-35; Claim 1, Line 18-19:
  Delete "ethylmethyacrylate" and insert --ethylmethacrylate--.

Column 32, Line 31; Claim 4, Line 19:
  Delete "ethylmethyacrylate" and insert --ethylmethacrylate--.

Signed and Sealed this
Nineteenth Day of February, 2013

Teresa Stanek Rea
*Acting Director of the United States Patent and Trademark Office*